United States Patent Office 3,334,679
Patented Aug. 8, 1967

3,334,679
METHOD AND DEVICES FOR THE SUPPLY
AND EXACT PROPORTIONING OF FUEL
Reinhard Bruning, Hamburg, and Johannes Zeyns, Hamburg-Bergedorf, Germany, assignors to North American Philips Company, Inc., New York, N.Y., a corporation of Delaware
Filed May 4, 1965, Ser. No. 452,994
Claims priority, application Germany, May 29, 1964, P 34,356
31 Claims. (Cl. 158—36.3)

ABSTRACT OF THE DISCLOSURE

A fuel injection system for a combustion engine in which the fuel is maintained in the valve and duct under a pressure which does not vary more than 1% of the nominal value, and the magnetically operated injection valve operates with equal opening and closing periods.

This invention relates to methods and devices for the supply and exact proportioning of fuel, more particularly for the injection into a combustion engine in which a pump supplies the fuel to a magnetically-controlled valve which passes a predetermined amount of fuel to the inlet during an opening period controlled electronically.

Injecting devices for combustion motors are known in which a predetermined volume of fuel is supplied to an inlet by means of a piston pump, the piston pump controlling the opening periods of the inlet. The fuel is proportioned in such devices by adjusting the stroke of the intermittently operating pump. It is thus possible within determined limits exactly to proportion the supply of fuel by using short connecting lines between the pump and the inlet and by suitable design of the inlet and suitable choice of the inlet area in the combustion space. However, the proportioning of the stroke volume is found to involve difficulty since the volume supplied is no longer proportional to the adjusted stroke volume with increasing number of inlets per unit time. This volume fluctuates according to a function which is difficult to determine and depends inter alia upon the number of inlets and upon the liquid pressure waves reflected from the inlet to the pump. In injecting devices it is also necessary to consider the fact that variations in the speed of flow in the hydraulic system result in pressure variations the amplitude of which is proportional to the variations in speed. Since with high numbers of revolution the unavoidable variations in speed of flow which rapidly succeed one another are in turn proportional to the rotation of speed, it follows therefrom, that noticeable variations in pressure occur which cause the volumes actually supplied to be unrecognizably distorted with respect to the volume desired. Injecting devices of this kind thus permit exact proportioning only approximately.

The variations in pressure might be decreased by greater elasticity of the system, distortions of the periods of injection then having to be taken into the bargain. Although the variations in pressure would disappear with perfect elasticity, the inlet periods determined by the piston of the pump would be completely disturbed by the greater flexibility. The volumes supplied per stroke would thus become arbitrary. The injecting devices in which the inlet periods and the volumes supplied are determined by means of the pump cannot therefore be used in the range of higher speeds of rotation.

It is also known to keep the fuel in store at a low pressure of aproximately 2.4 atms. by means of a continuously-operating gear pump in the supply line to a magnetically-controlled valve and to pass on the fuel at this predetermined pressure through said valve to the inlet. However, this device suffers from the fundamental disadvantage that the apertures of flow must be large at the low pressure of the fuel since the inlet periods can only be short if the inlets of fuel are effected in rapid succession. However, large apertures of flow require large valves and hence large masses to be moved which in turn are movable comparatively slowly because of their inertia. Furthermore, seating difficulties occur at the valve seating, since this rapidly wears away due to the large moving masses and the high speed. Further this device is incapable of passing on the fuel to the inlet without the influence thereof being noticeable in the supply line. Upon closure of the large valve seating, the column of fuel in the supply line is stowed, resulting in reflection waves which are not yet damped in the period during which the valve is closed. Consequently, when the valve is opened again, the column of fuel is no longer at a desired uniform pressure, so that the amount of fuel flowing to the inlet in the period during which the valve is open cannot be predetermined accurately. Interference effects causing variations in pressure also occur when the valve is opened, a sudden decrease in pressure occurring due to the large sectional area of the opening of the valve.

This injecting device also has the disadvantage that variations in the rate of flow in the hydraulic system result in pressure variations the amplitudes of which are proportional to the variation in speed. Since in this case also the unavoidable variations in rate of flow, which are proportional to the rotational speed, result in noticeable variations in pressure at high rotational speeds, the amounts actually supplied are unrecognizably distorted with respect to the nominal amounts during the opening periods determined by the magnetically-operated valve. Exact proportioning by means of this device is illusory, especially if the inlet periods succeed one another more and more rapidly and if, for example, 100 injections per second and more are necessary. A supply of fuel which is exactly proportioned can take place only if an amount of fuel at constant pressure flows through the valve to the inlet during a predetermined opening interval of the valve.

According to the invention, these disadvantages of the known methods of injection and devices for the supply and exact proportioning of fuel, especially the injection into a combustion engine, in which an intermittently-operating pump supplies the fuel to a magnetically-controlled valve which passes a predetermined amount of fuel to the inlet during an opening period controlled electronically are avoided in that the fuel supplied from a delivery tank by means of the pump is first stored at a pressure above atmospheric pressure in a storage space, which is kept under pressure by means of a gas and variable in size substantially without resistance, the intermittent extraction of fuel through the valve and the subsequent supply of fuel causing pressure variations less than 1% of the nominal pressure in the said space, which nominal pressure is adjusted by means of a pressure control device, the fuel kept ready at nominal pressure also within the valve being supplied to the inlet at short and equal opening and closing periods of the valve.

The fuel in the storage space is preferably stored at a pressure higher than 11 atms.

The storage space for the fuel which is kept under pressure by a gas acts as a space almost infinitely large but which may have dimensions which are finite and even very small. All the pressure variations caused by the intermittent extraction as well as the intermittent supply are compensated in the space almost completely, which is achieved in a very satisfactory manner by separating the space from a gas serving as a buffer by means of a thin diaphragm.

Lastly, even then it is only possible to pass on the fuel to the inlet in a quiet condition without interfering variations of volume if the fuel is kept ready at the valve seating at the nominal pressure.

According to a further embodiment of the method according to the invention, the pressure is controlled in the pressure-control device by leading the excess amount of fuel from the storage space back into the delivery tank through a control device which is adjusted automatically as a function of the prevailing atmospheric pressure and temperature, the variable pressure before the said control device caused by the respective atmospheric pressures and temperatures being supplied back as a control magnitude to a relief pressure valve determining the outlet of fuel from the storage space to the delivery tank, in order to match the nominal pressure in the storage space to the atmospheric density instantaneously prevailing. Variations in the atmospheric density act upon the pressure of the fuel in the storage space so that the injected amounts are proportional to the atmospheric density. The variations in atmospheric density thus constitute themselves in a simple manner a control magnitude through the changing adjustment of the control valve and the resulting pressure variations in the discharge of fuel, which control magnitude controls a valve determining the nominal operating pressure.

For carrying out the method according to the invention use is made of a device which is characterized by:

(a) A pressure buffer vessel comprising a vessel containing the fuel and in which the fuel is separated, at least in part, from a gaseous medium serving as a buffer by means of a slack diaphragm;

(b) A pump having a flexible diaphragm of a thickness which is multiple of the pump stroke, the pump at small lengths of stroke, pumping against a high pressure in the pressure buffer vessel;

(c) A pressure control device for automatically adjusting the nominal pressure of the fuel in the pressure buffer vessel, by which the excess fuel supplied by the pump is led back into the delivery tank;

(d) A magnetically-controlled valve of small height of stroke and having a centering diaphragm floating freely in the fuel and serving as a support for the valve needle and the armature in the valve casing.

In one advantageous embodiment the slack diaphragm of the pressure buffer vessel is in the form of a length of tube fastened at each end to a closed vessel which is non-elastic and hollow-cylindrical. The fuel is present either internally or externally of the diaphragm. A space of small dimensions is thus obtained which behaves as a space which is infinitely large and hence shows substantially no variations in pressure. The space has dimensions such that it can be formed without difficulty within a space available for a combustion motor while nevertheless ensuring an adequate constancy of pressure.

However, the pressure buffer vessel may also be formed differently. In another embodiment it is in the form of a vessel of arbitrary shape which contains a gas bladder enclosed by the slack diaphragm, that is to say an air-cushion into which a gas at the desired pressure has previously been introduced. The gas bladder may alternatively be fastened to a wall of the vessel in the form of a bag.

In another efficacious embodiment the vessel has the shape of a hollow sphere which, by means of the slack diaphragm is divided approximately at its centre, into one-half filled with gas and one-half filled with fuel. The action of all these pressure buffer vessels is invariably the same.

Under certain conditions it may be advantageous to divide the pressure buffer vessel into a plurality of such vessels through which the fuel flows in succession and which may also be smaller in size, said vessels being separated from one another by throttle areas, for example reductions in cross-section or diaphragms, provided in the communication channels. At any rate, however, the pressure control device and the magnetically-controlled valve are connected to the final pressure buffer vessel without the interposition of a throttle area.

In the device according to the invention the thick diaphragm of the slitless pump is preferably a thick-walled elastic length of tube the outer wall of which is attached to the casing of the pump in a liquid-tight manner and the inner wall of which is connected in a liquid-tight manner to a plunger which axially displaces the inner wall of the length of tube relative to its outer wall during the stroke movements. Comparatively great forecs are thus required for the movement of the plunger, but such a diaphragm affords the advantage that, when using it, one pump stage already suffices to put the fuel under a high pressure in one operation and transfer it to the pressure buffer vessel. Furthermore, it must be considered that the amounts of fuel supplied during each stroke are extremely small. The diaphragm need not therefore have a great mobility.

Slitless pumps are known which are fitted with sealing diaphragms. Such pumps are unsuitable for the supply of fuel within the device according to the invention since their thin diaphragms could not withstand the high pressures occurring. Although the slitless pump according to the invention also has a seal which is similar to a diaphragm, the total diaphragm pump according to the invention may rather be considered as a kind of a piston pump having its piston rigidly connected to the pump casing with the aid of a thick-walled elastic connection.

In one advantageous embodiment of the device according to the invention, the pressure-control device is not fixedly adjusted to a predetermined pressure. A further control device responding to atmospheric density provides an additional control magnitude which matches the adjusted pressure to the varying atmospheric conditions. To this end, the atmospheric-density control device varies the pressure of the excess volume of fuel supplied by the pump and flowing back to the delivery tank as a function of two bellows devices acting against each other on a throttle valve, one of these bellows devices being subjected to the differential pressure between the atmosphere and an inner filling of gas and the other being subjected to the pressure of the fuel that flows back. This fuel thus automatically varies the nominal pressure adjusted.

At the high frequency of injection obtained with the device according to the invention, the movements of the needle of the magnetically-controlled valve succeed one another very rapidly. The floating attachment of the valve needle ensured frictionless operation which in turn results in opening and closing times which are short and equal to one another and which permits exact proportioning at high speeds. The rapid succession of the movements ensures that the diaphragm, the edge of which is arranged in an annular groove of the valve casing, contacts neither the wall of the groove nor its base during operation. In fact, the edge of the diaphragm is positioned by the fuel at the centre of the groove in a manner as if the edge of the diaphragm were mechanically secured to this area. The centre of the diaphragm where the valve needle is secured oscillates between the final positions of the valve needle up and down with it.

Gentle braking of the valve needle during its upward movement is effected by means of a metallic ring secured to a disc arranged loosely on the spherical armature of the valve needle. When the armature approaches the base of a bore in the magnet, which base constitutes a pole-piece, the metallic disc with the ring secured thereto contacts the base of the bore. The fuel in the bore tends to escape as the disc is moved towards the base, but can do this only through narrow paths of flow, resulting in the movement of the armature being greatly braked. The metallic disc with the ring secured thereto is thus first braked by the fuel and acts as a spring after contacting the base of the bore.

The pressure buffer vessel and the interior of the valve preferably communicate with each other through a short line having a cross-section which makes possible low rates of flow, in order to maintain the constant pressure of the fuel in the pressure buffer vessel as far as within the valve.

A condition for satisfactory operation of the device is also that the fuel is properly filtered in known manner.

In order that the invention may be readily carried into effect, one embodiment of the device for carrying out the method according thereto will now be described in detail, by way of example, with reference to the accompanying diagrammatic drawings, in which.

Figure 1:
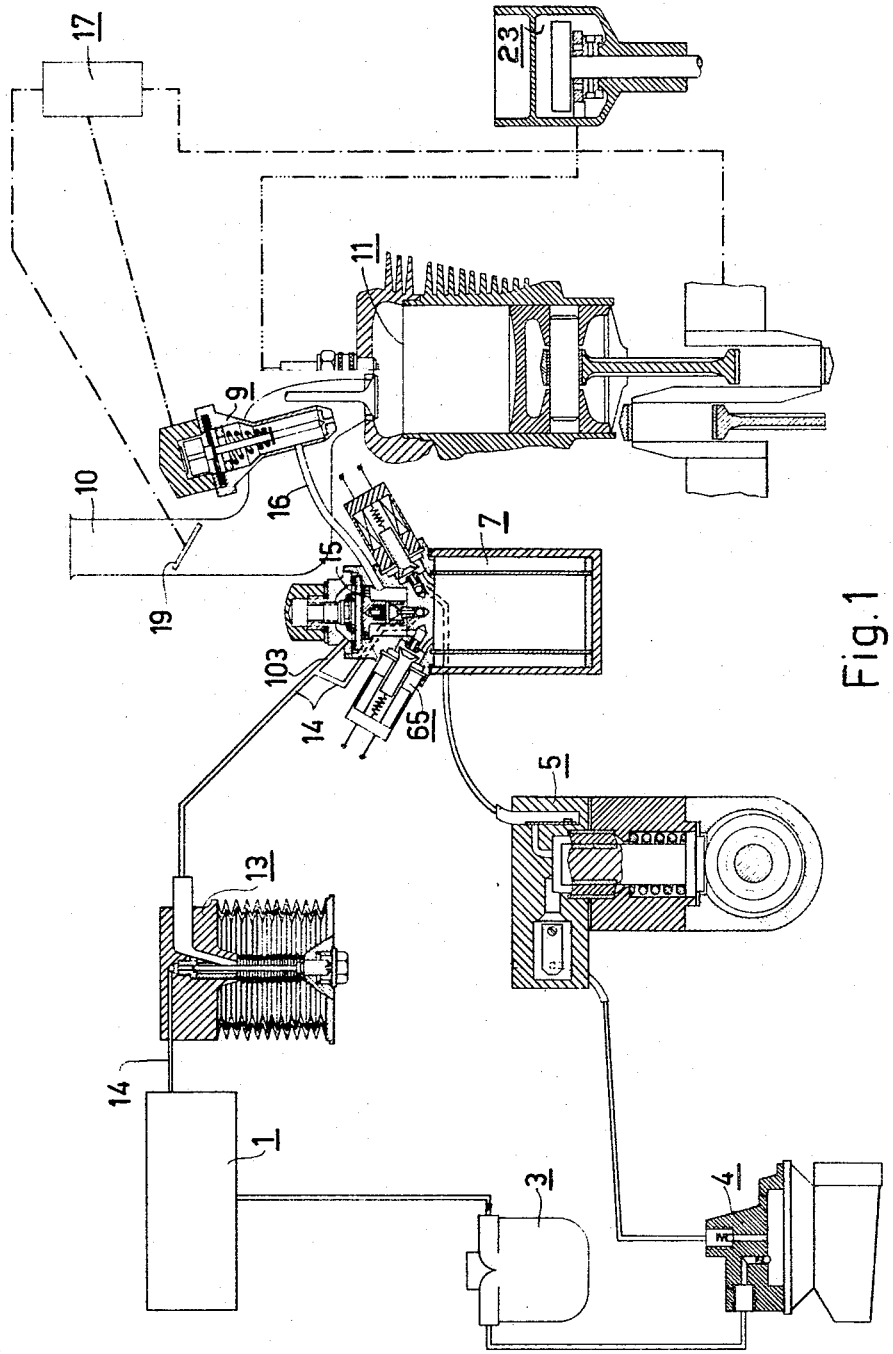
FIGURE 1 shows the fundamental structure of a fuel-injecting device.

Referring now to FIGURE 1, fuel is pumped from a delivery tank through a mechanical filter 3 to the injecting device comprising a slitless pump 5 which is connected to a pump 4 of usual construction and in which the fuel supplied at approximately atmospheric pressure is brought to a pressure of, for example, 16 atms. and supplied at this pressure to a pressure buffer vessel 7. It is naturally also possible to work with another pressure if shorter or longer periods of injection make such pressure more suitable. Despite the intermittent extraction of fuel through a magnetically-controlled valve 9 and a continuous intermittent supply of fuel from the pump 5, the fuel in the pressure buffer vessel 7 is maintained at a substantially constant pressure the variations of which lie within a tolerance limit of approximately 1%.

The pressure of 16 atms. is only a nominal pressure, however, which preferably corresponds to an assumed atmospheric pressure which is as low as possible and which is increased correspondingly at a higher atmospheric pressure. In fact, it is possible that the injection device must operate at a comparatively high pressure, for example, at sea level, or at a very low pressure, for example, in high mountainous areas. In addition to variations in atmospheric pressure, variations in temperature determined by the climate occure, all of which exert influences varying the conditions of combustion on the air drawn into a vacuum line 10 of the combustion space to be fed. The combustion space of the engine shown diagrammatically in FIGURE 1 must, however, be injected with an accurately predetermined amount of fuel per working stroke, the variations in pressure and temperature of the air drawn in being considered in determining the amount of fuel. This matching is effected by means of an atmospheric pressure and temperature control device 13 which is included in a flow-back line 14 through which the excess fuel pumped into the pressure buffer vessel 7 by the pump 5 is supplied back from the pressure buffer vessel 7 into the tank 1 via a relief pressure valve 15. The atmospheric pressure and temperature control device 13 controls the pressure of the fuel flowing back through the line 14 as a function of the atmospheric pressure and temperature. The pressure in the control device 13 responds to a diaphragm 90 of the relief pressure valve 15 and determines the pressure at which fuel may flow from the pressure buffer vessel 7 through a line 16 to the magnetically-operated valve 9.

The opening periods of the valve 9 are controlled by a pulse source 17 which operates inter alia as a function of the position of a throttle valve 19 arranged in the vacuum line of the combustion space. The position of valve 19 is determined by the position of the pedal operated, for example, by the driver of a motor car.

Figure 2:
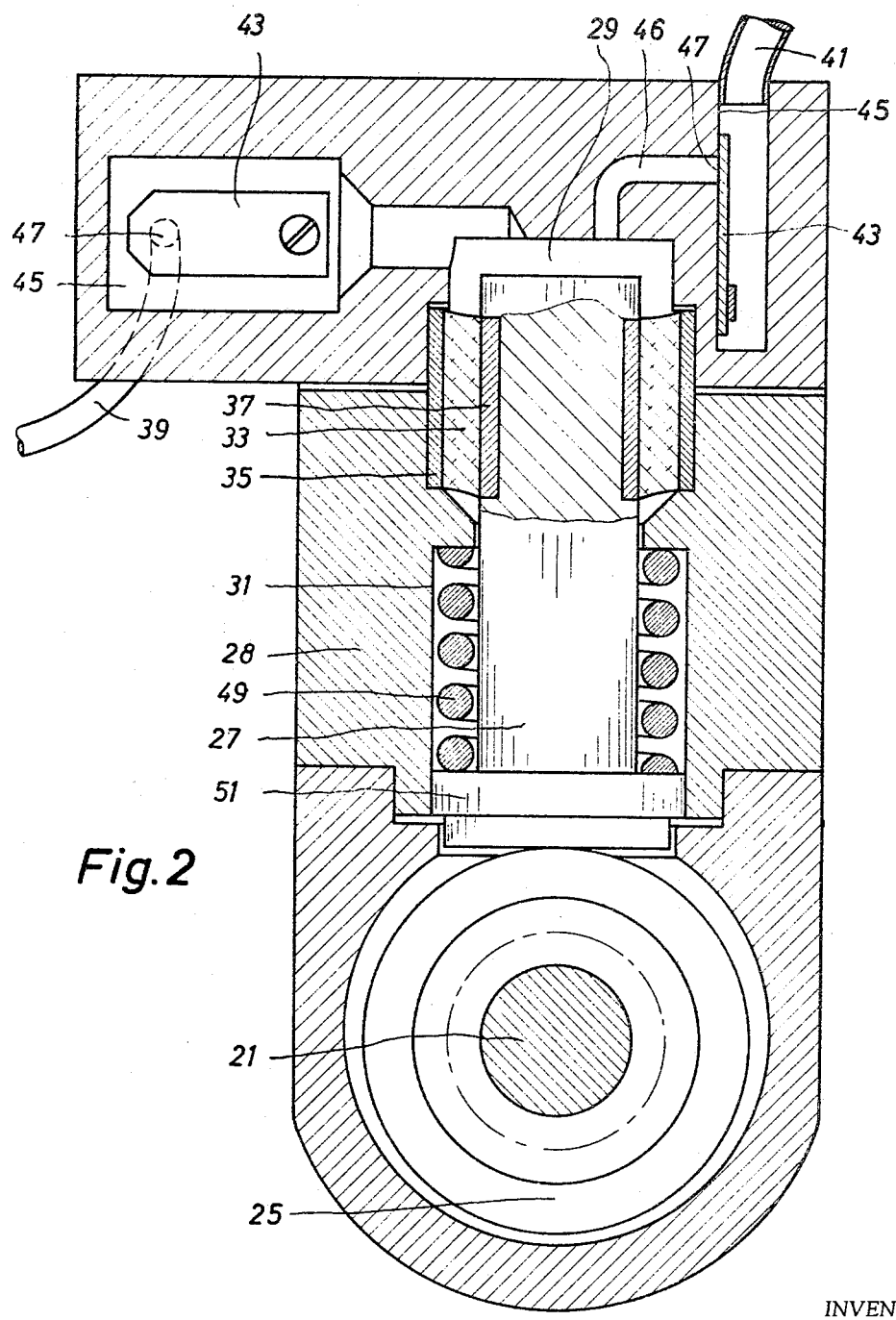
FIGURE 2 shows a slitless feed pump used in the devide of FIGURE 1.

The slitless pump 5 shown in FIGURE 2 is operated, for example, by a driving spindle 21 of a distributor 23. This driving spindle carries a cam 25 which lifts once a plunger 27 of the pump 5 during each revolution of the spindle 21. If desired, a plurality of cams may be provided which perform a plurality of pump movements during one revolution of the spindle. The plunger 27 extends into a space 29 of the pump 5. The space 29 of the pump and hence is casing 28 is sealed with respect to a lead-through device 31 of the plunger by means of a tubular rubber diaphragm 33. Copper-plated steel bushes 35, 37 are vulcanised on the inner and outer walls of the diaphragm 33. While the outer bush 35 is secured in a liquid-tight manner in the pump casing 28, the inner bush 37 is secured in a liquid-tight manner to the plunger. Due to the small height of the cam 25 relative to the diameter of the spindle 21, the strokes performed by the pump are very small so that the flexion of the diaphragm 33 remains within acceptable limits. The diaphragm 33 is strong enough, however, to withstand the high pump pressures of approximately 15 atms. If desired, the diaphragm may be screened from the fuel in the pump space 29 by means of a thin fuel-proof diaphragm layer.

To prevent fuel from flowing back from the pump 5 into a supply line 39 and from a line 41 into the pump space 29, spring valves are provided at the input and output of the pump space. However, the output valve may also be a non-return valve of the type commercially available. Each spring valve is in the form of a spring plate 43 which is attached at one side and just engages on a surface 45 on which the supply and discharge lines 39 and 46 terminate. The spring plates 43 are arranged relative to the lines 39, 46 and the pump space 29 so that they can be lifted off their supporting surfaces 45 only in the direction of flow of the fuel. The fuel reaches the spring plates 43 through the lines 39, 46 which terminate with their apertures 47 on the surfaces 45. When the fuel from the line pushes against the spring plate 43, it bends aside so that the fuel can flow further unhindered. The spring valves are capable of following the required number of revolutions without causing any impermissible decrease in pressure.

The casing 28 of the pump also contains a helical spring 49 one end of which engages the pump casing 28 and the other end of which pushes against a disc 51 of the plunger 27. The plunger 27 is thus continuously pushed against the spindle 21 by the spring 49 so that the cam determines, as a function of its height the movements of the plunger 27 and hence the height of the stroke.

In order that the tension in the diaphragm 33 may be kept low, the diaphragm is arranged so that it is free from tension at half the height of the stroke. The diaphragm is thus extended only halfway at the two final positions of the plunger.

Figure 3:
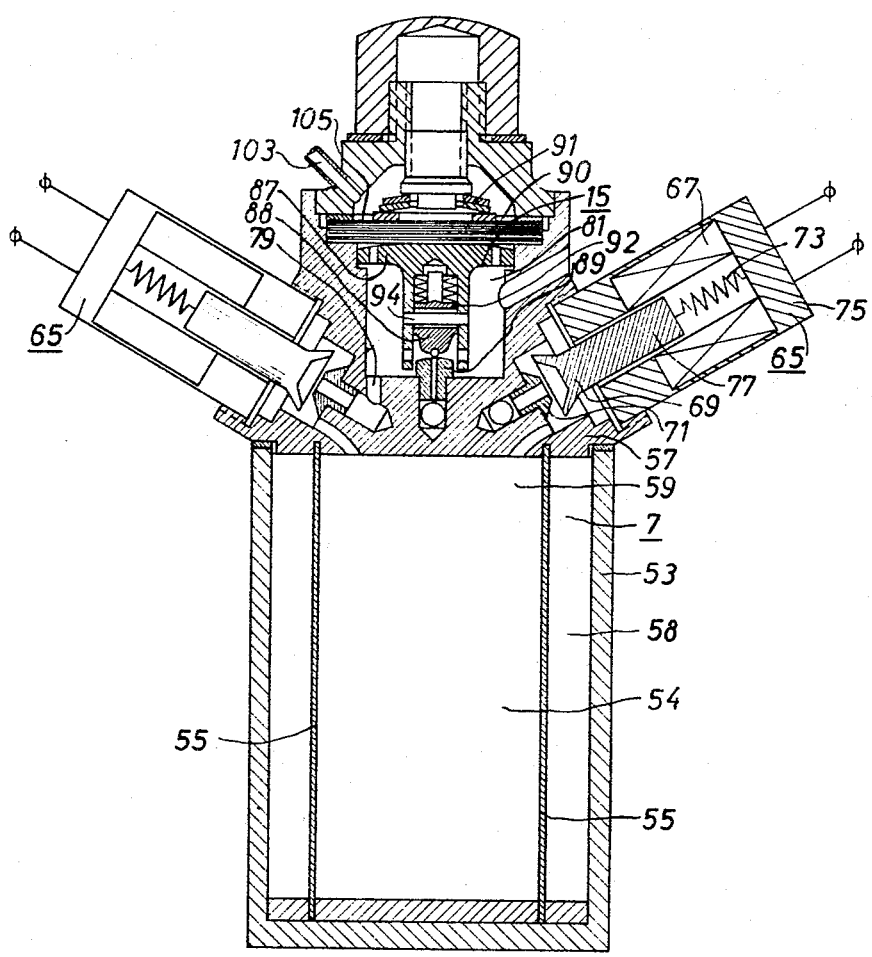
FIGURE 3 shows a pressure buffer vessel connected to the pump of FIGURE 2.

The pressure buffer vessel 7 shown in FIGURE 3, which is preferably built together with the pump 5 and the atmospheric pressure and temperature control device 13 or one of them, is, for example, a non-elastic closed vessel 53 of cylindrical shape. It contains a diaphragm 55 filled with fuel 54, the diaphragm preferably being a length of tube attached to the vessel 53 at each end. The diaphragm 55 may alternately be in the form of a bag and thus only have a ring for securing it to a wall 57 of the pressure buffer vessel.

The space between the walls 53, 57 of the vessel and the diaphragm 55 is filled with a gas 58. However, a reversal is also readily possible so that a space 59 enclosed by the diaphragm is filled with gas and the space of vessel 53 which surrounds it is filled with the fuel 54.

Figure 4:
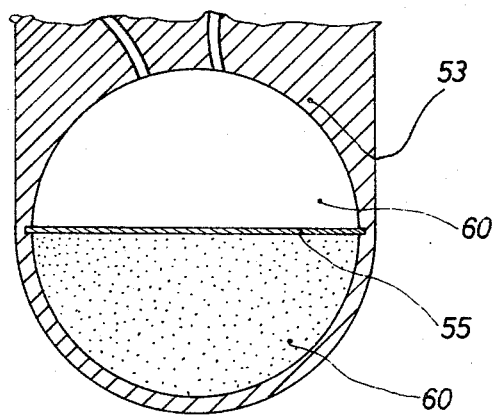
FIGURES 4 and 5 show further embodiments of the pressure buffer vessel.
Figure 5:
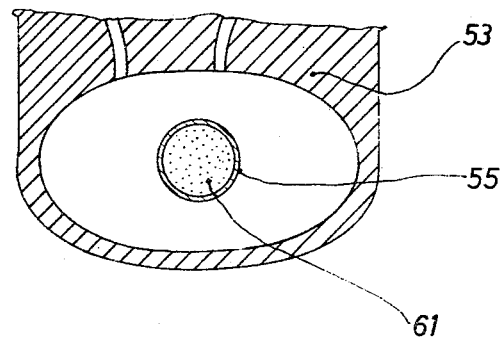

As an alternative, the pressure buffer vessel may have a quite different shape. In the embodiment of FIGURE 4 it has approximately the shape of a hollow sphere and the diaphragm 55 constitutes the separation between two spaces 60 of the sphere. In the embodiment of FIGURE 5 the space 53 of the pressure buffer vessel is in the form of a hollow sphere which is flattened with a view to saving space and which contains a gas-cushion 61 filled with gas under pressure, for example, air and enclosed by the slack diaphragm 55.

The diaphragm 55 of the buffer vessel is of a thinness such that it can compensate for any pressure pulses exerted on the fuel 54. During operation it will therefore continuously pulsate very slightly. This pulsating movement will compensate for pressure variations more satisfactorily as the diaphragm 55 is thinner and hence its mass smaller so that no inertia forces occur. A very thin design of the diaphragm 55 is possible since, when formed, for example, as an air bag, it is exposed in itself to neither pressure load nor tensile load but merely serves to separate the media gas and fuel which are substantially at the same pressure and which support the diaphragm on each side. In the embodiment of FIGURE 3 the diaphragm is supported externally by gas 58 enclosed in the vessel 53 and internally by the fuel 54. The volume of the space of the buffer vessel is only chosen so that the pressure variations never exceed the permissible tolerance limit of approximately 1%.

However, the diaphragm 55 will preferably have an elasticity such that it can fill the whole fuel-containing space if the pressure of the fuel disappears, for example, due to the absence of fuel, and the final residue of the fuel is pushed out of the buffer vessel by the gas.

It is further advantageous to make the diaphragm double-walled in order to obtain a secure separation between the media which is absolutely gas-tight and fuel-proof. In fact, materials which permanently satisfy both requirements and, in addition, have the required elasticity are not easy to manufacture. In the double-walled diaphragm the side which is adjacent the gas serving as a buffer consists of an elastic, gas-tight material, whereas the wall side which is adjacent the fuel is made from a fuel-proof elastic material. The double-walled design is not shown for the sake of surveyability.

Both the inlet in the space 59 enclosed by the diaphragm 55 and its outlet can be closed by magnetically-operated valves 65 which may be switched on and off preferably at the same time with the ignition mechanism of the engine (not shown). The valves 65 are open when the ignition is "on" and the coils 67 are energized. They are closed when the engine is switched-off and hence the coils 67 are not energized. Valve pieces 69, which push on elastic valve seatings 71 when the magnets 67 are not energized, serve to close the valves 65. The pressure of engagement of the valve pieces 69 is caused by springs 73 and especially by the fuel itself, each spring being secured at one end to a valve casing 75 and applying at its other end to a stem 77 of a valve piece 69. The closure of the buffer space 59 with the ignition switched-off serves to maintain, at least approximately, the pressure of 16 atms. present during operation in the whole of the device, in order that the pump need not first build up the required pressure when the ignition is switched-in. If the inlet and the outlet of the pressure buffer vessel coincide, it is possible, if desired, to use a single magnetically-operated valve having a larger cross-section than its aperture. Also, under certain conditions, the magnetically-operated valves may be wholly dispensed with if a supply pressure upon starting is not required.

A fuel-extraction duct 79 of the buffer vessel first leads to a space 81 which contains the non-return valve 15 and thence the fuel line 16 leads to the magnetically-operated valve 9 having a valve space 85 which is thus constantly filled with fuel which is at the same pressure as the fuel 54 in the internal space 59 of the buffer vessel. In a device realized in practice, the line 16 (FIGURE 1) is short and of a comparatively large section, thus reducing the rate of flow in the line and the possibility of reflection waves being formed. Furthermore the buffer vessel with its smoothing properties thus exerts its influence as far as in the interior of the magnetically-operated valve 9. The pump 5 fundamentally pumps an excess volume of fuel into the space 59. To prevent the nominal pressure of, say, 15 atms. from being exceeded, the fuel flows through the non-return valve 15 away into the line 14. This flowing away is made possible due to a valve stem 87 with its closing piece 88 being lifted off a valve seating 89 since the pressure in the space 81 pushes a diaphragm 90 upwards against the action of springs 91. To obtain a better division of forces, the valve piece 88 is connected to the valve stem 87 through a telescopic guide 92. Within the valve stem 87 there is provided a stop bolt 94 which eliminates the spring action of the telescopic guide 92 as soon as the stem 87 has been lifted over a given length.

Figure 6:
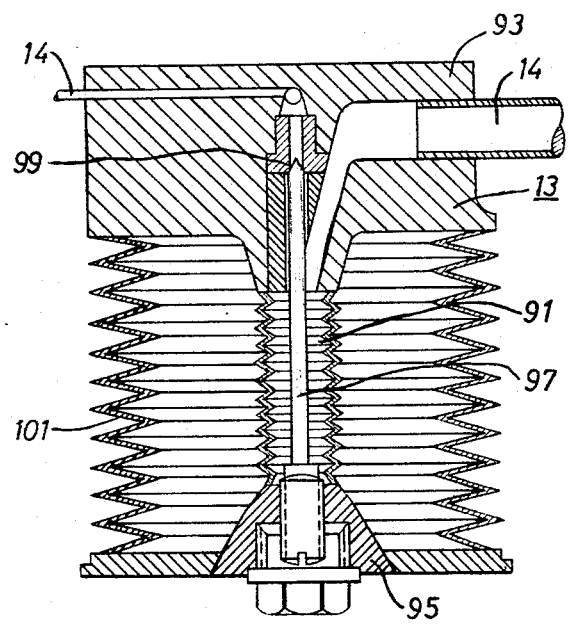
FIGURE 6 shows an atmospheric density and temperature control device used in the arrangement of FIGURE 1.

In the atmospheric pressure and temperature control device shown in FIGURE 6 the fuel flowing back through the non-return valve 15 flows into the interior of bellows 92. These bellows are secured, on the one hand, to a housing 93 of the control device and, on the other hand, to a junction piece 95 which in itself can move freely with respect to the housing 93. Within the junction piece 95 there is secured a needle valve 97 which extends through the interior of the bellows 91 are likewise secured to the junction piece 95 and the housing 93 of the control device. The interior of the bellows 101 formed by the inner wall thereof and the outer wall of the internal bellows 91 is filled with a gas of a pressure such that the complete matching of the injected amounts to the specific gravity of the atmosphere is obtained. A pressure of, for example, two atmospheres has been found suitable.

The external bellows 101 are subject to the atmospheric pressure and tend to push the needle valve 97 against the seating 99, thus preventing the fuel from flowing back. The fuel flowing back is thus driven into the line 14 and the bellows 91 in front of the valve seating 99, causing an increased pressure of the fuel in the internal bellows 91. The fuel will thus lengthen the bellows 91 and counteract the atmospheric pressure pushing the needle 97 against the valve seating 99. As shown as a desired counter pressure is reached, the needle 97 is lifted off the seating 99 and the fuel flows, at least in part, through the line 14 back into the delivery tank 1. However, the driving of fuel will not be eliminated completely. The pressure resulting therefrom also acts on the non-return valve 15. The oppositely-direction action of the pressures in the two bellows results in a control magnitude for the non-return valve which magnitude matches the pressure of the fuel in the space 59 to varying conditions of drawing-in air. The gas-filling between the two bellows also automatically causes a temperature control since it supports, as a function of the atmospheric temperature, the displacement of the needle valve 97 by means of the pressure of the fuel or the atmospheric pressure. Any ideal gas may be used for the filling but preferably air is used.

The driving pressure producing a control magnitude is led through a line 103 to that side (105) of the diaphragm 90 of the non-return valve 15 on which act the springs 91. Since the driving pressure can only increase the pressure of engagement of the valve on its seating, the valve 15 is so proportioned that it already allows fuel to flow into the line 14 at a certain pressure below the nominal pressure, that is to say slightly below 16 atms. The exact control of the valve 15 is effected continuously from the control device 13 through the line 103.

While a constant pressure of the fuel which is matched to the instantaneous conditions prevails in the internal space 85 of the valve 9 by using the structural parts of the injecting device described with reference to FIGURES 2 to 6, the magnetically-operated valve 109 (FIGURE 7) ensures that the fuel can flow from the internal space 85 through a valve seating 107 to an inlet 108 during opening periods accurately predetermined. A condition for an accurately proportioned injection is that the natural characteristics of the magnetically-operated valve completely disappears. In fact, the rising and descending movements of the needle valve, which rapidly succeed one another, are reproducibly the same only if said natural characteristic can be disregarded.

Figure 7:
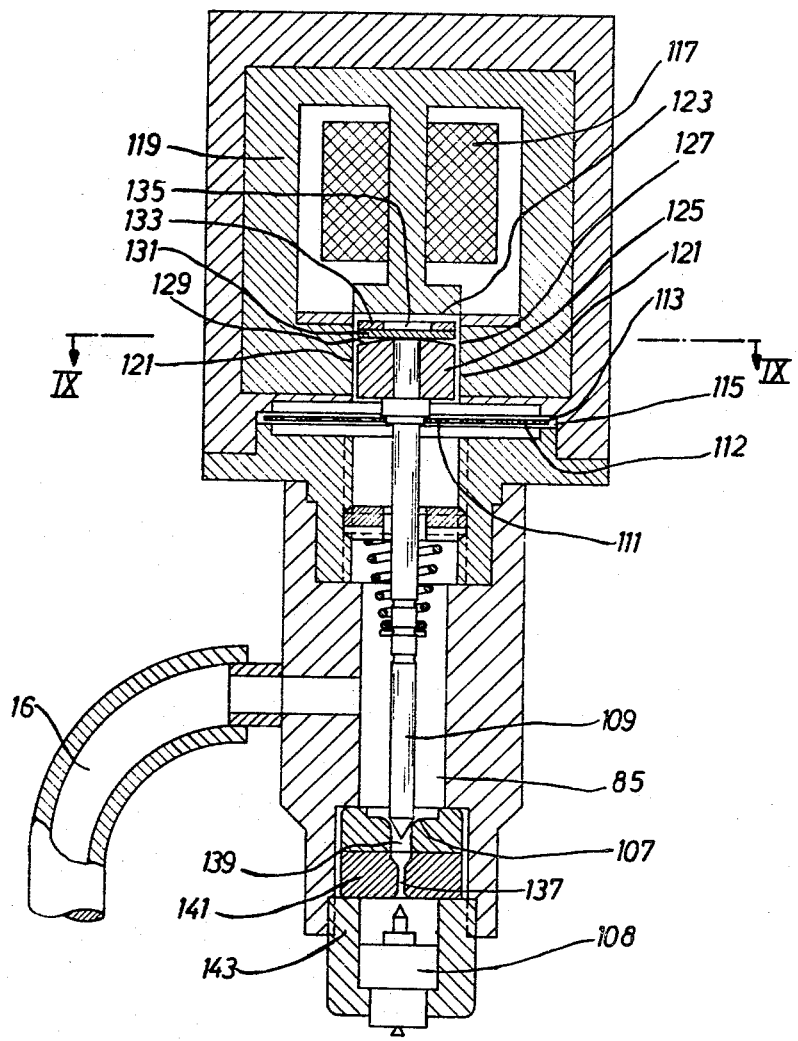
FIGURE 7 shows a frictionless valve operated magnetically.
Figure 8:
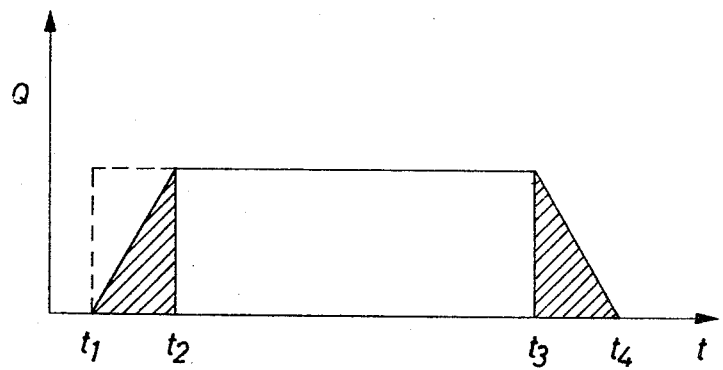
FIGURE 8 shows a working diagram of the said valve.

In the diagram of FIGURE 8 the quantity of flow Q is plotted against the time $t$ in an idealized curve which is substantially realised by means of the magnetically-operated valve of FIGURE 7. The needle valve 109 commences to lift itself off its seating at an instant $t_1$. This lifting process is terminated at the instant $t_2$. Since the pressure in the system is constant the fuel flows from this instant away through the valve at constant speed. The needle valve falls back on its seating 107 from the instant $t_3$. The valve is closed again at $t_4$.

The quantities of flow corresponding to the cross-hatched triangles at the beginning and at the end of the flow. If these triangles would have equal surface areas due to the time intervals $t_1$–$t_2$ and $t_3$–$t_4$ being equal, the quantity of flow would exactly correspond to a rectangle with the base line $t_1$ and $t_3$ and hence could be determined accurately.

The substantial equalization of the time intervals $t_1$–$t_2$ and $t_3$–$t_4$, due to which the absence of the natural characteristics of the magnetically-operated valve becomes manifest, is obtained in that the valve according to the invention operates substantially without friction. Small differences between the intervals $t_1$–$t_2$ and $t_3$–$t_4$ are negligible because the height of the stroke of the needle valve is only small (for example 0.2 mm.) and the time intervals are thus very short (for example approximately 0.5 msec.). The shortness of the time intervals is still enhanced in that all the movable valve masses are kept as small and as light in weight as possible, which is made possible and facilitated by the increased overpressure.

The small movable masses are also favourable in eletrical respect since only a small control energy is required for the movement thereof and this in turn has a favourable effect on the dimensions of the pulse source. 100 injections per second and more may be carried out without objection with the magnetically-operated valve according to the invention.

The valve needle 109 of the magnetically-operated valve is secured to the centre of a disc-shaped diaphragm 111, resulting in a frictionless support. The diaphragm is preferably made of spring bronze and has apertures 112 to allow the passage of fuel. An edge 113 of the diaphragm bears in an annular groove 115 which is filled with fuel. The groove has a width which is a little larger than the thickness of the diaphragm 111. Further the depth of the groove and its largest diameter are a little larger than the largest diameter of the diaphragm 111, but the lateral clearance is smaller than that of the armature in the magnet, in order to ensure that the armature can never contact the magnet. The diaphragm 111 can thus float freely within the groove. When the valve 9 is not in the operative condition the diaphragm 111 engages a wall of the groove. When the valve 9 is operative, however, the edge 113 of the diaphragm will float freely in the fuel because of the inertia of the fuel in the groove. In fact, the fuel cannot follow the movements of the valve needle and hence the movements of the edge 113 of the diaphragm as rapidly as would be necessary. The diaphragm will thus adjust itself in the groove at a given central position and remain in this position during operation as if it were rigidly secured in the groove. During this apparently rigid attachment the centre of the diaphragm will move up and down in accordance with the movements of the valve needle.

At its rest position, the valve needle is pushed against the seating 107 by a conical helical spring. The valve is thus closed. During the period of opening, a current will flow through a coil 117 as a function of the pulse source 17. A magnetic flux is thus produced in the laminated iron 119 of the valve 9, which is closed over pole-pieces 121 and 123. An armature 125 secured to the valve needle 109 will thus be pulled into a bore 127 of the field iron, since the armature 125 and a tendency to reduce the gap between its head 129 and the pole-piece 123. Since there is no mechanical friction the armature 125 will be attracted very rapidly. Consequently the armature will impact very heavily with the pole-piece 123, unless special steps are taken to prevent this. This heavy impact might result in longitudinal vibrations of the valve needle and hence in reflection waves which would render the pressure conditions in the valve unsurveyable. To prevent this and at the same time increase the life of the valve, the head of the armature 121 is first of all given a circular shape. Further the head carries a disc 131 which in turn carries an annular disc 133. The disc 131, too, may be turned out correspondingly. As the head 129 of the armature approaches the pole-piece 123 the movement of the armature is greatly damped by the fuel which tends to escape from the recess 135. The armature, upon the annular disc 133 being urged against the wall of the bore (the pole-piece 123), will cause slight flexion and hence braking of the annular disc. Longitudinal vibrations as well as the consequent reflection pressure waves are thus avoided, whilst at the same time the magnetic system is mechanically spared.

Figure 9:
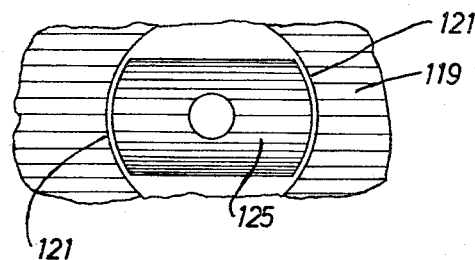
FIGURE 9 is a sectional view of the valve of FIGURE 7, taken on the line IX—IX.

To avoid eddy-currents, the iron of the armature 125 is laminated in parallel with the iron core 119. FIGURE 9 shows that the armature 125 is made flat and rounded relative to the poles 121. The gap between the poles and the armature 125 is thus reduced. Further the armature is prevented from abutting the edges of the field iron 119.

The seating 107 of the valve, which is resistant to wear and made of hard steel, has a cross-section approximately 5 times larger than is necessary per se for the flow of fuel. The stroke of the valve needle 109 may thus be short. Nevertheless the cross-section of the aperture remains very small relative to known constructions since the high operating pressure in itself allows of small sections of the aperture. The flow, which is accurately proportioned according to time, is determined according to volume only by means of a subsequent throttle capillary tube 137 which is provided in the direction of flow behind the valve seating in a duct 139.

The thottle capillary tube 137 is connected directly, preferably free from abutment edges, to the valve seating 107 and is located in a disc 141 which is exchangeably screwed into a tubular extension 143 of the valve casing. The connection free from abutment edges makes it possible for the fuel, when the valve is opened, to flow through the capillary tube 137 without reflection pressure waves from the capillary tube penetrating the space 85 of the valve.

Connected directly to the disc 141 is an inlet 108 of known construction in which reflection pressure waves can hardly be avoided since the fuel is driven up in a short time until the valve opens. The reflection pressure waves occurring on or in the inlet 108 become negligible for the injection, however, since they are immediately damped on the disc 141 and thus rapidly rendered harmless substantially still at the stage of opening. The damping of the reflection pressure waves is thus effected during a fraction of the period of injection. A short distance between the seating of the valve and the inlet 108 is important for the rapid damping. In an example constructed in practice, this distance was approximately 20 mms.

What is claimed is:

1. A device for the supply and metering of fuel comprising:
    (a) a delivery tank for said fuel:
    (b) a pressure buffer storage vessel having two parts separated by a diaphragm, said fuel in one of said parts and a gaseous medium serving as a buffer in the other of said parts;
    (c) a feed pump provided with a flexible diaphragm, said pump when operating with small lengths of stroke pumps against a high pressure in said pressure buffer storage vessel;
    (d) a pressure control device for automatically adjusting the nominal pressure of said fuel in said buffer storage vessel by which the excess amount of fuel supplied by said pump may be conducted back to said delivery tank;
    (e) and a magnetically operated valve having a small stroke and provided with a centering diaphragm, a valve needle and an armature;
    (f) said fuel supplied from said delivery tank by said pump being stored in said pressure buffer storage vessel which is variable in size substantially without resistance, and the intermittent discharge of fuel through said valve and the subsequent supply of fuel causing pressure variations in amounts less than 1% of the nominal pressure in said buffer storage vessel.

2. A device for the supply and metering of fuel as claimed in claim 1 wherein the diaphragm of said buffer storage vessel is a slack, thin, resilient membrane, substantially free from inertia and impervious to fuel.

3. A device for the supply and metering of fuel as claimed in claim 1 wherein said diaphragm constitutes two layers, the layer which is adjacent the gas serving as a buffer being a resilient, gas-tight material and the layer adjacent said fuel being a resilient fuel-impervious material.

4. A device for the supply and metering of fuel as claimed in claim 2 wherein said membrane is in the form of a tube, and a closed, rigid cylindrical vessel filled with a gas, said tube being secured at two sides to said vessel.

5. A device for the supply and metering of fuel as claimed in claim 2 wherein said diaphragm is in the form of a bag and is secured to a wall of said buffer storage vessel.

6. A device for the supply and metering of fuel as claimed in claim 1 where said buffer storage vessel is in the form of a hollow sphere having its internal chamber divided into two halves by means of said diaphragm.

7. A device for the supply and metering of fuel as claimed in claim 6 wherein a gas cushion is present in one of said halves resulting from said resilient diaphragm.

8. A device for the supply and metering of fuel as claimed in claim 5 wherein said buffer storage vessel is in the form of a flattened hollow sphere.

9. A device for the supply and metering of fuel as claimed in claim 1 wherein a plurality of buffer storage vessels are arranged in series in the direction of flow, and throttle areas for separating said buffer storage vessels.

10. A device for the supply and metering of fuel as claimed in claim 1 wherein said magnetically operated valve is provided with a valve casing having an annular groove therein, and an armature and a magnet, said diaphragm having said valve needle secured to the center thereof, the outer edge of said diaphragm having said valve needle secured to the center thereof, the outer edge of said diaphragm positioned in said annular groove of the valve casing, said annular groove having a width slightly larger than the thickness of said diaphragm and having a depth such that the outer edge of said diaphragm in the operating position thereof contacts the groove before the armature and magnet.

11. A device for the supply and metering of fuel as claimed in claim 10 wherein during operation the fuel filling said groove maintains said diaphragm floating at a central position which adjust itself automatically.

12. A device for the supply and metering of fuel as claimed in claim 11 wherein said diaphragm in constituted of a perforated spring bronze, the ratio between the diameter of the diaphragm and thickness thereof being such that it centers can follow the movements of the needle and its edge does not substantially move in said groove.

13. A device for the supply and metering of fuel as claimed in claim 1 further comprising an armature in said magnetically operated valve having field iron inclusive of the poles constituted of laminated material.

14. A device for the supply and metering of fuel as claimed in claim 13 wherein the head of the armature is provided with an annular disc which contacts one of said poles in the bore of the magnet when the armature is lifted thereby braking the lifting movement without a shock effect.

15. A device for the supply and metering of fuel as claimed in claim 14 wherein said device is provided with another disc which is secured to said annular disc and is located remote from said armature and arranged loosely in said bore.

16. A device for the supply and metering of fuel as claimed in claim 15 wherein the head of said armature is a spherical shape.

17. A device for the supply and metering of fuel as claimed in claim 10 further comprising in said valve a throttle capillary tube through which said fuel is discharged, the volume of fuel being passed by said valve being determined by both the fuel and the cross-section of said throttle capillary tube in the direction of fuel flow.

18. A device for the supply and metering of fuel as claimed in claim 1 further comprising a pressure control constituted of two bellows and a throttle valve provided with a valve needle, said buffer vessel being provided with a non-return valve, the pressure of the excess amount of fuel supplied by said pump and conducted back into said delivery tank is controlled as a function of said two bellows acting oppositely on said throttle valve, said bellows being subjected respectively to atmospheric pressure and the pressure of the fuel conducted back to said delivery tank, the latter pressure being an additional control magnitude to said non-return valve of the pressure buffer storage vessel.

19. A device for the supply and metering of fuel as claimed in claim 18 wherein one of said bellows is located within the other of said bellows, the fuel being conducted back through said inner bellows, said fuel exerting axial forces on said inner bellows whereby said valve needle is lifted off the valve seating, an external bellows influenced by the atmospheric pressure secured to the free end of said inner bellows, and said valve needle being biased against the valve seating.

20. A device for the supply and metering of fuel as claimed in claim 19 wherein the closed space between said internal and external bellows has a gas which converts the atmospheric variations in temperature into pressure variations.

21. A device for the supply and metering of fuel as claimed in claim 20 wherein said closed space is filled with an ideal gas.

22. A device for the supply and metering of fuel as claimed in claim 20 wherein the pressure in said internal bellows is proportional to the prevailing atmospheric pressure, said pressure acting on the diaphragm of said non-return valve associated with said pressures control thereby controlling the opening pressure of said valve as a function of the atmospheric pressure.

23. A device for the supply and metering of fuel as claimed in claim 22 wherein the pressure of engagement of said valve needle on its seating is controllable as a function of said pressure by means of the diaphragm of said non-return valve, the latter being exposed on one side to the fuel pressure in said buffer storage vessel and on the opposite side to the pressure of the fuel flowing back in the device.

24. A device for the supply and metering of fuel as claimed in claim 23 further comprising a valve rod and a telescopic spring connection to said valve rod, said valve needle being provided on said valve rod.

25. A device for the supply and metering of fuel as claimed in claim 24 further comprising an abutment which eliminates the spring action when the valve rod is lifted over a predetermined height.

26. A device for the supply and metering of fuel as claimed in claim 1 wherein said valve is electromagnetic and the inlet and outlet apertures of said buffer storage vessel are adapted to be closed when said valve is not energized.

27. A device for the supply and metering of fuel as claimed in claim 1 wherein said feed pump is a slitless pump provided with a casing and a plunger and an annular diaphragm therein comprising a thick-walled resilient length of tube, the outer wall of which is secured in a liquid-tight manner to the pump casing and the inner wall of which is connected to said plunger, the latter during its strike movements axially displacing the inner wall of the length of tube relative to said outer wall.

28. A device for the supply and metering of fuel as claimed in claim 27 further comprising a spring valve arranged at least in the inlet of said pump supply space being in the form of a spring plate located on a flat surface and secured at one side to a part of said pump, said spring valve being urged against the surface by the fuel thus preventing fuel from flowing into said supply line which extends from the surface of engagement and is open relative to said spring plate.

29. A method for the supply and metering of fuel comprising supplying fuel to a magnetically controlled valve from a delivery tank, said valve passing a predetermined amount of fuel to the inlet during an opening period, storing the fuel pumped from said delivery tanks at a pressure above atomspheric pressure in a storage space which is kept under pressure by means of a gas and variable in size susbtantially without resistance, the intermittent extraction of fuel through said valve and the subsequent supply of fuel causing pressure variations less than 1% of the nominal pressure in said space, adjusting said nominal pressure by means of a pressure control device, and supplying the fuel being kept ready at nominal pressure within the valve to the inlet at short and equal opening and closure periods of the valve.

30. A method for the supply and metering of fuel as claimed in claim 29 wherein the fuel is stored at a pressure higher than 11 atmospheres.

31. A method for the supply and metering of fuel as claimed in claim 29 and further for the pressure control in the storage space conducting back the excess supply of fuel from the storage space into the delivery tank automatically as a function of the prevailing pressure and temperature of the atmosphere, and feeding the varying conducting driving pressure caused by the respective atmospheric pressures and temperatures as a control magnitude to a pressure control valve of the storage space for the purpose of matching the nominal pressure in the space to the atmospheric density instantaneously prevailing.

References Cited
UNITED STATES PATENTS

| | | | |
|---|---|---|---|
| 3,017,922 | 1/1962 | Peterson | 158—36.3 |
| 3,240,191 | 3/1966 | Wallis | 123—139 X |
| 3,240,192 | 3/1966 | Gratzmuller | 123—139 X |
| 3,269,319 | 8/1966 | Dargas | 103—223 X |

CARLTON R. CROYLE, Primary Examiner.

RALPH D. BLAKESLEE, Examiner.

UNITED STATES PATENT OFFICE
CERTIFICATE OF CORRECTION

Patent No. 3,334,679                                             August 8, 1967

Reinhard Bruning et al.

It is hereby certified that error appears in the above numbered patent requiring correction and that the said Letters Patent should read as corrected below.

Column 5, line 57, for "occure" read -- occur --; column 6, line 19, for "is", first occurrence, read -- its --; column 8, line 37, after "bellows 91" insert -- to a valve seating 99. Second bellows 101 which surround the bellows 91 --; column 9, line 31, for "corresponding" read -- correspond --; column 12, line 17, for "centers" read -- center --; column 13, line 36, for "strike" read -- stroke --.

Signed and sealed this 23rd day of July 1968.

(SEAL)
Attest:

Edward M. Fletcher, Jr.                               EDWARD J. BRENNER
Attesting Officer                                               Commissioner of Patents